Patented Mar. 30, 1948

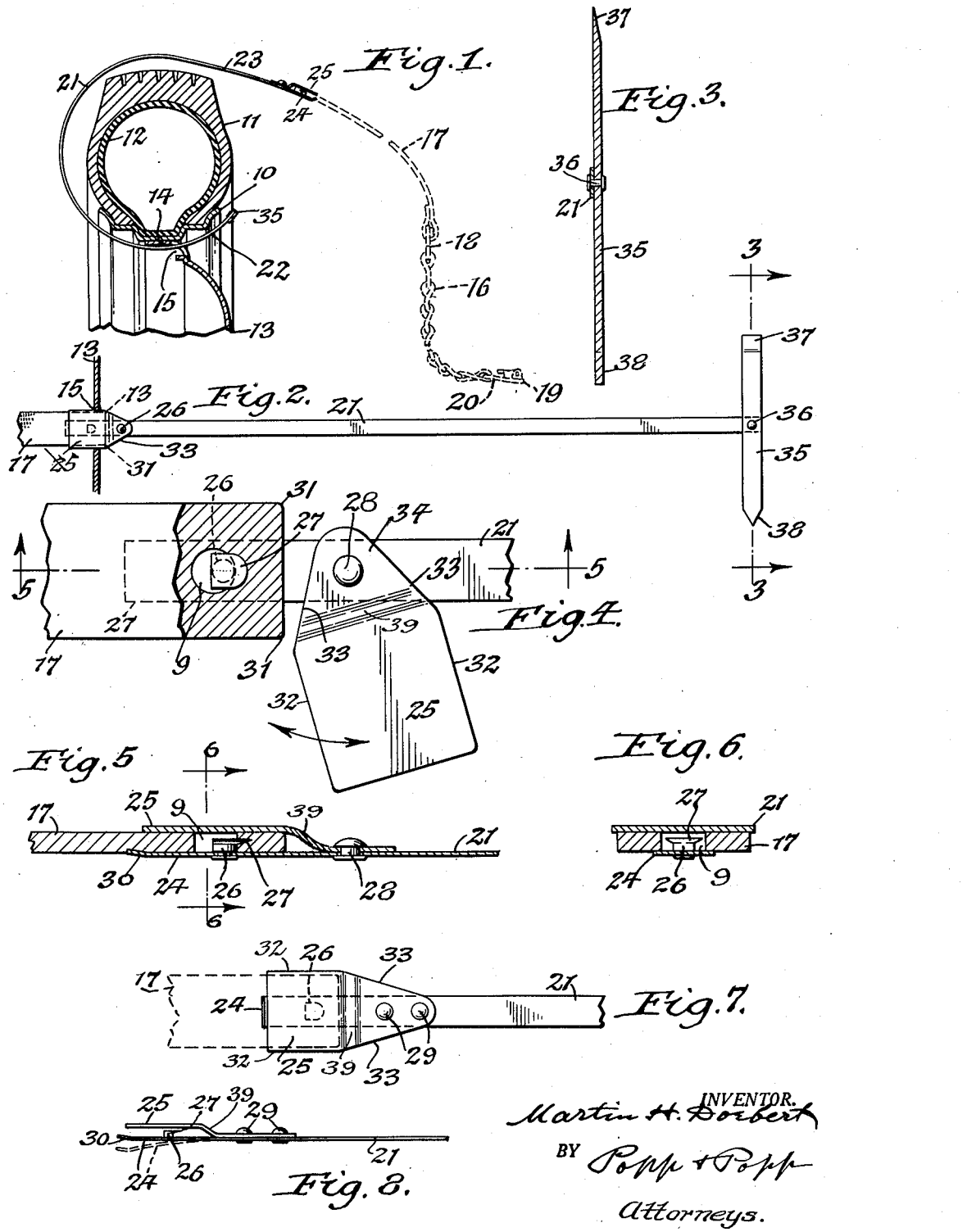

2,438,547

UNITED STATES PATENT OFFICE 2,438,547

TOOL FOR APPLYING TRACTION DEVICES ON WHEELS

Martin H. Doebert, Buffalo, N. Y.

Application February 17, 1945, Serial No. 578,408

1 Claim. (Cl. 81—15.8)

This invention relates to a tool for applying traction devices, commonly known as skid chains, mud hooks or the like, to the circular tire and rim of a wheel which assembly, for convenience, will be hereafter referred to as the runner of the wheel.

As is well known considerable difficulty is experienced in applying traction devices to the runners of wheels, particularly where the latter are mounted on the car close to the fenders or other parts of the same.

It is therefore the object of this invention to provide a tool for applying traction devices to the runners of wheels which is very simple in construction, which permits of easily and conveniently applying traction devices to wheel runners and which can also be utilized for cleaning dirt, snow and ice from a wheel when required, also for removing the side disks from automobiles and like work and also folded compactly for storage when not in use.

In the accompanying drawings:

Fig. 1 is a cross section of the circular runner of a wheel showing the manner in which the tool of this invention is used for applying a traction device to the runner.

Fig. 2 is a plan view of this tool on a reduced scale and the handle thereof in a position for use as a chisel for removing dirt, snow and ice.

Fig. 3 is a section, on an enlarged scale, taken on line 3—3, Fig. 2.

Fig. 4 is a fragmentary plan view, partly in section, showing the attaching end of the applying tool engaged with the fastening strap at one end of a traction device and the latch or keeper of this tool in its open or inoperative position.

Fig. 5 is a fragmentary longitudinal section taken on line 5—5, Fig. 4 but showing the keeper in its closed or operative position.

Fig. 6 is a cross section taken on line 6—6, Fig. 5.

Fig. 7 is a fragmentary view of a modified form of this invention.

Fig. 8 is a side elevation of the same.

In the following description, similar reference characters indicate like parts in the several views of the drawings.

The tool which embodies the improvement of this invention may be organized for applying traction devices of various kinds to automobile wheels varying in construction and the traction device and wheel shown in the drawings may therefore be regarded as examples of such devices and wheels. As shown in Fig. 1, the numeral 10 represents the rim or felly of an automobile wheel on the periphery of which is mounted a pneumatic tire comprising an outer shoe or casing 11 which is of U-shape in cross section and provides the tread of the tire and an inner tube 12 adapted to be inflated by air to maintain the tire in its distended operative condition. This rim and the casing and tube of the tire will, for convenience of description, be hereinafter sometimes referred to by the general term as the circular runner of the wheel. The rim of the wheel may be mounted on the hub of the same in any suitable manner but preferably by means of a circular disk 13 which is provided with an annular flange 14 engaging the inner side of the wheel rim and provided adjacent to said flange with a plurality of circumferential slots 15 one of which is shown in Figs. 1 and 2.

The traction device commonly known as a non-skid chain or mud hook consists generally of a chain section or gripping member 16 adapted to pass crosswise around the tread and sides of the tire, an attaching strap 17 connected with the inner end of the chain section by means of an inner bar 18 and adapted to pass outward through a slot 15 of the wheel disk, and a buckle 19 which is connected by a bar 20 with the outer end of the chain section or gripping member and to which the attaching strap is adapted to be fastened in the usual and approved manner. At its outer end the attaching strap 17 is provided with an opening 9 for a purpose which will presently appear.

As is well known the passing of the traction device around the tire or runner members of the wheel preparatory to connecting the ends of the same, is usually attended with considerable difficulty and inconvenience, especially during inclement weather when it is raining or snowing or the road is muddy or icy.

The applying tool or device which is made in accordance with my invention and permits the traction device to be quickly and conveniently attached to the runner of a wheel is preferably constructed as follows:

The numeral 21 represents the body of the tool which has the form of a longitudinal strip or band of resilient material such as spring steel, the rear part 22 of which tends to curve into the shape of the letter C and the front part 23 of which tends to assume a tangent or straight shape relative to the rear part, as shown in Fig. 1.

On its front end the spring band 21 is provided with a clasp or gripper which is adapted to grasp the outer end of the strap 17 of the traction device preparatory to drawing this strap through the slot 15 in the wheel disk 13 and pulling the traction device around the tire and rim of the wheel. This clasp comprises an inner or lower gripper jaw 24 adapted to engage the inner side of this strap and an outer jaw or keeper 25 which is adapted to engage with the outer side of this strap.

On its inner side the inner jaw 24 of the clasp is provided with a coupling pin 26 which projects toward the inner side of the outer jaw 25 and is adapted to extend into the opening 9 in the attaching strap and engage a side thereof, as shown in Fig. 5. At its inner end this coupling pin is provided with a rearwardly projecting sharp prong or hook 27 which is adapted to penetrate a part of the wall or bore of the opening 9 between opposite sides of the strap, and thereby secure a positive non-slipping hold on the attaching strap and reliably connect the traction device with the tool whereby the same is applied to the wheel runner.

In the construction shown in Figs. 1 and 3–6, the outer jaw 25 is pivotally connected at its inner end with the spring strip by means of a rivet 28 whereby this jaw may be turned to one side of the coupling pin and its hook so as to clear the same and thus permit the attaching strap to be connected with the spring strip by passing this hook into the hole 9 of the strap and pushing the prong into the wall or bore of this hole so as to penetrate the material of the strap a sufficient extent to form a positive interlock between this hook and the strap and reliably connect the same, as shown in Fig. 4. After the pin and hook have been thus engaged with the hole in the attaching strap the upper jaw is turned inwardly so that it extends over this pin and hook and the perforated end of the attaching strap, as shown in Figs. 1, 2, 5 and 6, and securely coupling the traction device with the applying tool.

In the construction shown in Figs. 7 and 8, the outer jaw 25 is connected with the front part of the spring strip 21 by means of two rivets 29, 29 so that this jaw cannot turn on the spring strip and therefore projects permanently over the coupling pin and hook. This form of the clasp requires the inner and outer jaws 24, 25 to spring apart to permit the attaching strap of the traction device to be connected with and disconnected from the coupling pin and hook.

When using this applying tool the relatively straight front end of the spring strip together with the connecting clasp therein is passed first through the slot 15 of the wheel disk from the outer to the inner side of the wheel and thereafter the greater part of the curved rear end of the spring strip is passed through this slot, thereby carrying the straight front part of the spring strip upwardly along the inner side of the tire and outwardly over the tread of the same whereby the coupling clasp is moved into a position in which the same is easily accessible for connecting the same with the attaching strap of the traction device, as shown in Fig. 1. While the applying tool is in this position, its rear end projects from the outer side of the wheel disk a sufficient distance to permit of grasping the same and pulling outwardly therein. Thereafter the applying tool is pulled outwardly until the same has been fully withdrawn from the slot 15 of the wheel disk and the attaching strap of the traction device has also been pulled outwardly sufficiently to carry the chains or ground gripping members of the traction tool around the tread of the tire. The applying tool is now removed from the traction device and the latter is firmly secured to the wheel runner by connecting its attaching strap 17 and buckle 19 in the usual manner.

For the purpose of preventing the clasp of the applying tool from catching on parts of the automobile adjacent to the inner side of the wheel while passing this tool inwardly and upwardly around the runner of the wheel, the front end of the lower jaw 24 is extended forwardly beyond the front end of the companion upper jaw 25, as shown in Figs. 1, 2, 5, 7 and 8, so as to serve as a guard along the front edge of the jaw 25 and prevent the same from being caught on parts adjacent to its path, and this extended part of the inner jaw 24 is also curved or inclined toward the outer jaw 25, as shown at 30 in Figs. 1, 5 and 8, thereby causing this curved surface upon engaging any parts during the operation of placing the tool into its receiving position to be deflected away from said parts and thus avoid interference with the use of this tool.

The slot 15 in the wheel disk 13 is only slightly wider than the width of the strap 17 of the traction device to permit the latter to pass freely through the same but the width of the spring strip or body of the applying tool is made comparatively narrow in order to conserve material, weight and cost.

If, however, the spring strip is made narrower than the attaching strap 17 the corners 31 at the front end of the strap which project laterally from opposite sides of the spring strip would be liable to catch on the inner side of the wheel disk during the operation of pulling the traction device around the wheel runner unless some means were provided to prevent such an occurrence and permit the attaching strap to pass freely through said slot without encountering any obstruction.

If desired the applying tool may be manipulated by taking direct hand hold on the rear end of the body or spring strip 21 but it is preferable to employ a separate handle for this purpose which consists of a bar 35 pivoted midway of its length to the rear end of the spring strip by means of a rivet 36 and provided at one end with a chisel formation 37 and at its opposite end with a pointed or V-shaped formation 38, which permits of using this bar or handle for removing dirt or ice from the wheel, also removing the side disk 13 of the wheel and also performing other work which may be necessary.

When this applying tool is not in use the handle bar 35 may be turned on the body 21 so as to be arranged parallel therewith and thus render the tool more compact for carriage and storage. Preparatory to using the tool the handle bar is turned on the spring strip so that it stands at right angles thereto, as shown in Fig. 2, in which position the same may be conveniently grasped by the handle for actuating the tool.

For the purpose of preventing the corners 31 of the attaching strap from being caught on the wheel disk on either side of the slot 15, the front part of the jaw or keeper 25 is made as wide, and preferably slightly wider, than the width of the front end of the attaching strap and the opposite longitudinal edges 32 of the same are made parallel, as shown in Figs. 4 and 7, so that when this jaw 25 covers this part of the strap the corners 31 of the latter are concealed under this jaw, as shown in Figs. 2 and 7. The opposite longitudinal edges 33 of the rear part 34 of the jaw 25 are also inclined and diverge forwardly, as shown in Figs. 2, 4 and 7, so that when the clasp with the traction strap 17 attached thereto is drawn outwardly through the slot 15 one or the other of said inclines 33 will engage with one or another end of the slot 15 and shift the clasp laterally into a position in which it is centered relative to the slot 15. The inner jaw 24 of the attaching clasp is preferably made in one piece with the body 21 of the spring strip and extended in the same plane from the front end of the latter but the front and rear parts of the outer jaw 25 are off-set from each other and its front part is spaced from the inner jaw 24 to provide a space for reception of the attaching strap 17 while the rear part of the jaw 25 engages the strip 21 and is connected therewith. In order to prevent the shoulder 39 which is formed between the front and rear part of the jaw 25 from catching on the wheel disk, upon withdrawing the same outwardly through the slot 15 in this disk, this shoulder 39 is inclined or curved, as shown in Fig. 5, and thus operates as a wedge which deflects the jaw 25 from the edge of the slot 15 and thereby facilitates application of the traction device to the wheel runner.

If the slot 15 in the wheel disk 13 is obstructed by mud or ice these can be readily removed or cleaned away by means of either the chisel 37 or the point 38 of the handle bar and thus facilitate the operation of applying the traction device to the runner of the wheel by means of this tool under varying weather conditions.

Obviously this applying device can be used for attaching devices, other than that shown in the drawings, to the runners of wheels, for example traction devices in which the chains are replaced by toothed plates or similar members which are capable of gripping the ground or roadway.

I claim as my invention:

A tool for applying a traction device, having a perforated strap, to the circular part of a wheel; which tool comprises a strip shaped pulling body, and means for attaching the front end of said body to said strap including two jaws adapted to receive the perforated part of said strap between them, and one of said jaws being provided with a centrally positioned stud extending toward the other one of said jaws and having a rearwardly projecting prong at the top thereof adapted to penetrate the bore or wall of the perforation in the strap.

MARTIN H. DOEBERT.

REFERENCES CITED

The following references are of record in the file of this patent:

UNITED STATES PATENTS

| Number | Name | Date |
|---|---|---|
| 2,128,286 | Davis | Aug. 30, 1938 |
| 2,234,902 | Keppel | Mar. 11, 1941 |
| 2,238,325 | Hudson | Apr. 15, 1941 |
| 2,257,657 | Spahr | Sept. 30, 1941 |
| 2,293,650 | Hudson | Aug. 18, 1942 |
| 2,328,680 | Royer | Sept. 7, 1943 |